United States Patent
Huang et al.

[15] 3,683,044
[45] Aug. 8, 1972

[54] HEAT-CURABLE COMPOSITION COMPRISING POLYGLYCIDYL XYLYLENE-DIAMINE AND PROCESS FOR PREPARATION OF POLYGLYCIDYL XYLYLENEDIAMINE

[72] Inventors: Ching Yun Huang, Osaka; Kazuo Ueno, Kyoto; Keizo Masawaki, Amagasaki, all of Japan

[73] Assignee: Japan Gas-Chemical Company Inc., Tokyo, Japan

[22] Filed: Dec. 29, 1970

[21] Appl. No.: 102,520

[30] Foreign Application Priority Data

Dec. 29, 1969   Japan ........................45/1324

[52] U.S. Cl. .........260/830 TW, 260/2 EP, 260/2 EN, 260/2 BP, 260/78.4 EP
[51] Int. Cl. .........................C08f 45/00, C08g 30/08
[58] Field of Search ............260/2 EP, 2 BP, 830 TW

[56] References Cited

UNITED STATES PATENTS

| | | | |
|---|---|---|---|
| 2,951,822 | 9/1960 | Reinking | 260/2 EP |
| 3,577,313 | 5/1971 | Bolger | 260/2 BP |
| 3,595,882 | 7/1971 | Bremmer | 260/2 EP |

FOREIGN PATENTS OR APPLICATIONS

| | | | |
|---|---|---|---|
| 1,008,161 | 10/1965 | Great Britain | 260/2 EP |

*Primary Examiner*—Paul Lieberman
*Attorney*—Wenderoth, Lind & Ponack

[57] ABSTRACT

A process for preparing a novel polyglycidyl xylylenediamine having an epoxy equivalent of 90 – 200 which comprises reacting xylylenediamine with epichlorohydrin and dehydrochlorinating the resulting interdediate with an alkali. A heat-curable resinous composition comprising said polyglycidyl xylylenediamine exhibits a low viscosity suitable for casting and adhesive, and a cured product therefrom has a high heat distortion temperature.

13 Claims, No Drawings

HEAT-CURABLE COMPOSITION COMPRISING POLYGLYCIDYL XYLYLENE-DIAMINE AND PROCESS FOR PREPARATION OF POLYGLYCIDYL XYLYLENEDIAMINE

This invention relates to a heat-curable resinous composition comprising a novel polyglycidyl amino compound, polyglycidyl xylylenediamine, and to a process for the preparation of said novel compound.

There have been known various methods of preparing N-glycidyl amino compounds by reacting epichlorohydrin with amines. For instance, the specification of U.S. Pat. No. 2,951,822 proposes a method of preparing N-glycidyl amino compounds comprising reacting epichlorohydrin with a primary aromatic amine such as aniline and 4,4'-diaminodiphenyl methane. The specification of British Pat. No. 816,923 discloses a method of preparing N,N'-diepoxides comprising reacting epichlorohydrin with a 4,4'-di-(monoalkylamino)-diphenyl methane or 4,4'-(monocycloalkylamino)-diphenyl methane. In the process disclosed in the specification of U.S. Pat. No. 3,014,895 glycidyl amino compounds are prepared by the reaction between 4,4'-diaminophenyl sulfone and epichlorohydrin.

These known polyglycidyl amino compounds give resinous products when heated together with a curing agent, and these compounds are used for adhesive, casting and the like. Properties demanded for a resinous composition in use for adhesives or casting are a good workability of the composition and an excellent quality of the resulting cured product, particularly a high heat distortion temperature.

In such known polyglycidyl amino compounds, in the case of a single use thereof, if they are prepared in the low viscosity state with a view to obtaining a good workability, the resulting cured products formed from such low viscosity compounds exhibit a very low heat distortion temperature. Thus, when it is tried to obtain a cured product of a high heat distortion temperature, use of compounds of a high viscosity cannot be avoided. Accordingly, there has not been present a polyglycidyl amino compound meeting the above two demands at the same time, namely a good workability and a high heat distortion temperature of the cured product prepared therefrom. The foregoing will be specifically explained by referring to the actual operation. When the viscosity of a resinous composition is too high and its workability is poor, in the case of electrical and electronic applycations as casting, potting, encapsulation and sealing, the composition is not intruded completely into voids formed among the parts and hence, the insulation is incomplete. In the case of application as adhesives, the high viscosity results in various operational disadvantages. For instance, because of a high viscosity it is difficult to coat the composition onto materials to be bonded, or it is very difficult to blend it with a filler.

With a view to developing excellent polyglycidyl amino compounds free of such defects, we made our research and found that polyglycidyl xylylenediamines obtained by the reaction between xylylenediamine and epichlorohydrin have a relatively low viscosity resulting in a good workability and give cured products exhibiting a high heat distortion temperature.

The polyglycidyl xylylenediamine of this invention giving a heat-curable resinous composition of the above-mentioned excellent properties has an epoxy equivalent ranging from 90 to 200. By the term "epoxy equivalent" is meant the number of grams of product that contain 1 mole equivalent of epoxy.

The polyglycidyl xylylenediamine of an epoxy equivalent of 90 to 200 of this invention may be prepared by reacting xylylenediamine with 3 – 8 moles, per mole of the xylylenediamine, of epichlorohydrin to form a xylylene chlorohydrin diamine intermediate, and dehydrochlorinating the xylylene chlorohydrin diamine intermediate by reacting it with an alkali.

Taking N,N,N',N'-tetraglycidyl xylylenediamine as an example, the process of this invention is expressed by the following reaction formula:

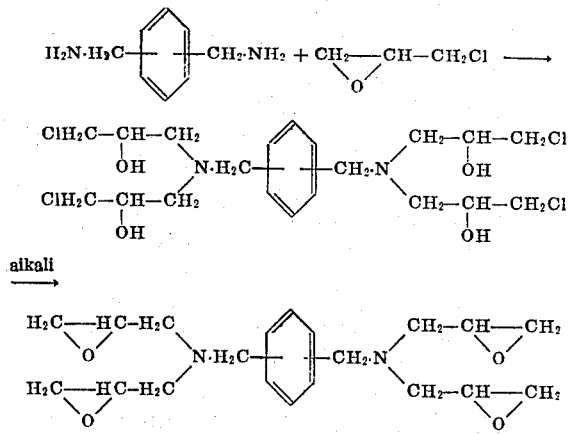

As is seen from the above reaction formula, the process of this invention is accomplished by the two-stepped reaction. At the first step, epichlorohydrin is ring-opened and added to the xylylenediamine to form a xylylene chlorohydrin diamine as an intermediate. Then, at the second step, the intermediate is dehydrochlorinated with an alkali to ring-close the chlorohydrin. In the process of this invention, the second step is carried out successively after the first step without isolating the intermediate formed at the first step.

As the xylylenediamine to be used as the starting material in the process of this invention, there may be cited ortho-xylylenediamine, meta-xylylenediamine, paraxylylenediamine, and mixtures of these isomers.

In the process of this invention, epichlorohydrin is used in an amount of 3 – 8 moles, preferably 3 – 6 moles, per mole of the xylylenediamine. In case epichlorohydrin is used in an amount less than 3 moles per mole of the xylylenediamine, there is a tendency that the resulting compound is highly viscous. In case epichlorohydrin is used in an amount exceeding 8 moles per mole of the xylylenediamine, unreacted epichlorohydrin remains in the resulting reaction mixture in a large amount, and hence, it takes a long time to recover the intended product from such reaction mixture.

The reaction is effected at a temperature ranging from 0° to 100° C., preferably 30° to 60° C.

The reaction may be conducted in an organic solvent unreactive with epichlorohydrin and xylylenediamine under reaction conditions, for instance, inert solvents of aromatic hydrocarbons such as benzene toluene, xylene, chlorobenzene, ketones such as methyl ethyl ketone and methyl isobutyl ketone, and alcohol such as ethanol and propanol. It is also possible to carry out the reaction in the absence of such solvent. It is desired to add to the reaction system a small amount of water or phenol as promotor, water being especially preferable as promotor. It is preferred that water is used in an amount of about 10 to about 30 milliliters per mole of xylylenediamine.

As the method of addition of epichlorohydrin, there may be adopted either a method where the whole of epichlorohydrin is added at a time before initiation of the reaction, or a method where epichlorohydrin is gradually added dropwise to the reaction system. In general, the first step reaction is completed within about 8 hours.

As the alkali to be used as a dehydrochlorinating agent at the second stage dehydrochlorination reaction, there may be cited hydroxides of alkali and alkaline earth metals such as sodium hydroxide, potassium hydroxide and barium hydroxide, and aluminates such as sodium aluminate. It is suitable that the alkali is used in an amount of 4 – 5 equivalents per mole of xylylenediamine. The alkali may be used in the form of a solid or an aqueous solution, but generally, it is preferable to use the alkali in the form of an aqueous solution. In case the alkali is added in the form of an aqueous solution. It is desired that the concentration of the alkali in the aqueous solution is within a range of from 40 to 50 percent by weight.

As the method of addition of the alkali, there may be adopted either a method where the whole of the alkali is added at a time before initiation of the second step reaction, or a method where the alkali is gradually added little by little during the reaction. It is preferable to add the alkali gradually little by little during the reaction, and there may be also added an inert organic solvent such as ethers and alcohols to the reaction mixture.

In general, the ring-closure reaction by dehydrochlorination is conducted at a temperature ranging from 0° to 80° C. and it is preferred to carry out the reaction for 30 minutes to 18 hours.

The epoxy equivalent of the polyglycidyl xylylenediamine prepared according to the process of this invention varies depending on the mole ratio of starting xylylenediamine and epichlorohydrin or on the reaction conditions. The product of this invention takes a form of a mixture of various polyglycidyl xylylenediamines varying in the epoxy equivalent. More specifically, the product is obtained in the form of a mixture of tetraglycidyl xylylenediamine (epoxy equivalent = 90) where four glycidyl groups are bonded to 1 molecule of xylylenediamine, triglycidyl xylylenediamine (epoxy equivalent = 101) where three glycidyl groups are bonded to one molecule of xylenediamine, diglycidyl xylylenediamine (epoxy equivalent = 124) where two glycidyl groups are bonded to one molecule of xylylene diamine, and monoglycidyl xylylenediamine (epoxy equivalent = 192) where one glycidyl group is bonded to 1 molecule of xylylenediamine. Thus, it should be understood that the value of the epoxy equivalent of the product of this invention is an average value. The product of this invention has an epoxy equivalent of 90 – 200, and a product exhibiting an epoxy equivalent of 90 – 160 is particularly preferred.

Depending on the reaction conditions, a small amount of a polyglycidylated low polymer is sometimes present in the product of this invention. It is desired to avoid incorporation of such low polymer as much as possible. For this purpose, it is advantageous to conduct the first step reaction in an inert organic solvent with use of a small amount of water as promotor at a lower temperature. It is also effective to conduct the second step reaction under reduced pressure and complete the ring-closure while removing water added as promotor and formed as by-product.

After completion of the second step reaction, salts formed as by-products are removed from the reaction mixture by filtration and the unreacted epichlorohydrin and volatile matters such as the solvent are removed by distillation. Thus there is obtained the intended polyglycidyl xylylenediamine.

The so obtained polyglycidyl xylylenediamine of this invention takes a form of a viscous liquid at room temperature and in general, the viscosity of the product is within a range of from about 1,000 to about 30,000 centistokes (at 25° C.). The polyglycidyl xylylenediamine of this invention is very stable and durable to long-time storage.

The viscosity of the polyglycidyl xylylenediamine of this invention varies to some extent depending on the reaction conditions, the amount of the glycidyl group added to xylylenediamine, and other factors. A product having such a low viscosity as 3,000 – 5,000 centistokes (at 25° C.) but being capable of giving a cured product of a high heat distortion temperature can be readily prepared in accordance with the process of this invention.

The polyglycidyl xylylenediamine of this invention can be readily cured with the aid of curing agents customarily used for curing of glycidyl compounds, such as aliphatic or aromatic polyamines and organic carboxylic anhydrides. For instance, it can be readily cured at room temperature with the aid of an aliphatic amine such as diethylene triamine and triethylene tetramine. When it is heated with an aromatic amine such as metaphenylene diamine, 4,4'-diaminodiphenyl methane and 4,4'-diaminodiphenyl sulfone or an organic carboxylic anhydride such as phthalic anhydride, hexahydrophthalic anhydride, nadic methyl anhydride (maleic anhydride adduct of methyl cyclopentadiene) and nadic anhydride (maleic anhydride adduct of cyclopentadiene), it can be easily cured to give a cured product of a high heat distortion temperature.

In the case of known glycidyl compounds, the curing with an aliphatic amine gives cured products having a heat distortion temperature of about 80° to about 100° C., whereas in the case of the polyglycidyl xylylenediamine of this invention the curing with an aliphatic amines gives cured products having a heat distortion temperature exceeding 120° C. In general, when cured products excellent in heat resistance are desired, an aromatic amine is used as a curing agent. In the case of such aromatic amines, a similar tendency is observed. Namely, curing of known glycidyl compounds with an aromatic amine gives cured products having a heat distortion temperature of about 150° C., whereas curing of the novel polyglycidyl xylylenediamine with an aromatic amine, for instance, 4,4'-diaminodiphenyl methane, gives cured products having a heat distortion temperature exceeding 200° C.

As is described above, the polyglycidyl xylylenediamine of this invention possesses a viscosity sufficiently low to exhibit a good workability and gives a cured product being superior in the heat distortion temperature to cured products formed from known glycidyl compounds. Further, the polyglycidyl xylylenediamine of this invention is substantially colorless or slightly colored faintly yellow. In view of the fact that a polyglycidyl amino compound obtained by using metaphenylene diamine instead of xylylenediamine and reacting it with epichlorohydrin is extremely viscous and takes the form of a black solid or semi-solid, it can be said that this invention attains an unexpected result and gives meritorious contributions to the art.

The polyglycidyl xylylenediamine prepared in accordance with this invention provides an industrial material of excellent properties, when it is used either singly or in combination of other substance. When it is used singly, it exhibits a low viscosity suitable for adhesive and casting, and a cured product prepared therefrom shows a high heat resistance. Accordingly, the polyglycidyl xylylenediamine of this invention is an industrial material very suitably applicable to casting adhesive and coating where a low viscosity and a high heat resistance of the cured product are required. Further, when the polyglycidyl xylylenediamine of this invention is combined with known glycidyl ethers of a polyhydric phenol having a 1,2-epoxy equivalency greater than 1, there are provided heat-curable resinous compositions having excellent properties. In this case, it is preferred that 5 – 500 parts by weight, especially more than 20 parts by weight, of the polyglycidyl xylylenediamine is used per 100 parts by weight of the said glycidyl ehter of a polyhydric phenol. For instance, when the glycidyl ether of a bisphenol A is used as the glycidyl ether of a polyhydric phenol and it is combined with the polyglycidyl xylylenediamine of this invention, the resulting composition can give a cured product particularly excellent in heat resistance.

Further, especially good results are obtained when a commercially available novolak-type epoxy resin is combined as the glycidyl ether of a polyhydric phenol with the polyglycidyl xylylenediamine of this invention. Novolak-type epoxy resin heretofore marketed as heat-resistance epoxy resins give cured products excellent in heat resistance, but because of their high viscosity, use of such resins involves various operational disadvantages. However, when such resins are used in combination of the polyglycidyl xylylenediamine of this invention, their viscosity is extremely lowered and workability of the resulting compositions is quite excellent. Further, the heat resistance of cured products is not at all degraded but rather improved by the blending with the polyglycidyl xylylenediamine.

This invention will now be explained by referring to examples.

EXAMPLE 1

A 1-liter capacity four-neck flask equipped with a stirrer, a reflux condenser, a thermometer and a funnel was charged with 85 g (0.52 mole) of metaxylylenediamine, 347 g (3.75 moles) of epichlorohydrin and 200 g of toluene, and the reaction was carried out at 40° C. for 7 hours under agitation. After completion of the reaction, 250 cc of ethyl ether was added to the reaction mixture, and 50 percent aqueous solution containing 220 g (5.5 moles) of sodium hydroxide was added dropwise to the mixture at 10° C. under agitation over a period of 2.5 hours. After completion of the addition, the reaction was further continued for 30 minutes. After completion of the reaction, the organic layer was separated and water was removed therefrom by a treatment with anhydrous magnesium sulfate. Unreacted epichlorohydrin and the solvent were removed from the organic layer by distillation under reduced pressure at 80° C. Thus there was obtained 210 g of a faintly yellow viscous liquid polyglycidyl xylylenediamine having a viscosity of 3,000 centistokes at 25° C. and an epoxy equivalent of 123, and exhibiting a Gardner gloss number less than 1.

Compositions were prepared by blending curing agents indicated in Table 1 with 100 parts of the so formed polyglycidyl xylylenediamine, and they were cured under conditions indicated in Table 1. The heat distortion temperature of each of the cured products was measured according to ASTM D–648. Results are shown in Table 1.

TABLE 1

| Curing Agent | Amount Added of Curing Agent (parts) | Curing Conditions | Heat Distortion Temp. of Cured Product (°C.) |
| --- | --- | --- | --- |
| Metaxylylenediamine | 28 | (room temperature × 24 hours) + (100°C. × 2 hours) | 123 |
| 4,4'-Diaminodiphenyl | 40 | (room temperature × 24 hours) + (60°C. × 90 minutes) + (130°C. × 3 hours) + (150°C. × 5 hours) | 204 |
| Nadic methyl anhydride | 120 | (room temperature × 24 hours) + (60°C. × 90 minutes) + (130°C. × 3 hours) + (150°C. × 5 hours) + (200°C. × 16 hours) | 236 |

Among the above compositions, one prepared by employing metaxylylenediamine as curing agent was chosen, and it was used for bonding two steel plates under the conditions; a compression pressure of 5 kg/cm², a curing temperature of 80° C. and a bonding time of 2 hours. The strength of the resulting bond was measured. As a result it was found that the shearing tensile strength was 132 kg/cm².

EXAMPLE 2

In the same reacator as used in Example 1, a mixture of 34 g (0.25 mole) of para-xylylenediamine, 185 g (2.00 moles) of epichlorohydrin and 200 g of ethyl alcohol was reacted at 40° C. for 3 hours. After completion of the reaction, 100 cc of ethyl alcohol was added to the reaction mixture, and 50 percent aqueous solution containing 123 g (2.02 moles) of sodium hydroxide was added dropwise at 20° C. to the mixture over a period of 1 hour. Then the reaction was further continued for 30 minutes. The organic layer was separated, and unreacted epichlorohydrin and the solvent were distilled off under reduced pressure at 80° C. Thus there was obtained 102 g of a viscous liquid polyglycidyl xylylenediamine having a viscosity of 10,000 centistrokes at 25° C. and an epoxy equivalent of 132. The product was colored very faintly yellow and its Gardner gloss number was less than 1.

EXAMPLE 3

A mixture of 85 g (0.63 mole) of metaxylydinediamine, 174 g (1.87 moles) of epichlorohydrin and 200 g of chlorobenzene was reacted at 40° C. for 3 hours. After completion of the reaction, the reaction mixture was cooled to 20° C., and 200 cc of ethyl ether was added thereto. To the mixture was added dropwise at 20° C. 50 percent aqueous solution containing 165 g (4.13 moles) of sodium hydroxide over a period of 2 hours. The organic layer was separated and concentrated under reduced pressure at 80° C. Thus there was obtained 170 g of a viscous liquid polyglycidyl xylylenediamine having a viscosity of 9,000 centistrokes at 25° C. and an epoxy equivalent of 165. The product was colored faintly yellow and its Gardner gloss number was less than 1.

EXAMPLE 4

A 3-liter capacity four-neck flask equipped with a stirrer, a thermometer, a funnel and a reflux cooler provided with a water-metering device was charged with 204 g (1.5 moles) of metaxylylenediamine, 583 g (6.3 moles) of epichlorohydrin, 750 ml of toluene and 22.5 ml of water. The mixture was reacted at 50° C. for 3 hours. Then the second step reaction was conducted at 70° C. under reduced pressure (270 mmHg) while adding dropwise from the funnel 50 percent aqueous solution containing 480 g (6 moles) of sodium hydroxide and removing water from the reaction system. The addition of the aqueous solution of sodium hydroxide was completed in 3 hours. After completion of the addition of the sodium hydroxide solution, the reaction was further continued for 30 minutes. The Amount removed of water was totally 330 ml.

After the completion of the reaction, the reaction mixture was cooled to 40° C., and filtered to remove sodium chloride formed during the reaction. The filtrate was concentrated. Thus there was obtained 524 g of a faintly yellow, transparent viscous liquid resinous product having a viscosity of 6,100 centistrokes at 25° C. and an epoxy equivalent of 102, and exhibiting a Gardner gloss number less than 1.

100 Parts of the so formed resin was mixed with 48 parts of 4,4'-diaminodiphenyl methane and the blend was cured under the same conditions as those of the run of Example 1 using 4,4'-diaminodiphenyl methane as curing agent. The heat distortion temperature of the resulting cured product was 203° C.

EXAMPLE 5

75 Parts of the resinous product obtained in Example 4 was blended with 25 parts of a commercially available novolak-type epoxy resin. The viscosity of the resulting blend was 100,000 centistrokes at 40° C. 32.2 Parts of 4,4'-diaminodiphenyl methane was incorporated as curing agent into the blend, and the resulting composition was allowed to stand still at room temperature for 24 hours, and heated at 50° C. for 2 hours, at 100° C. for 2 hours and finally at 200° C. for 3 hours. The heat distortion temperature of the resulting cured product was 200° C.

The viscosity of the above commercially available novolak-type epoxy resin alone was 915,000 centistrokes at 40° C. When a mixture of 100 parts of the said epoxy resin and 28 parts of 4,4'-diaminodiphenyl methane was cured under the same condition as above, there was obtained a cured product having a heat distortion temperature of 197° C.

What we claim is:

1. A heat-curable resinous composition comprising a para- or meta- polyglycidyl xylylenediamine or mixtures thereof, said polyglycidyl xylylenediamine having an epoxy equivalent within the range of from 90 to 200, and a curing agent.

2. The heat-curable resinous composition set forth in claim 1, wherein said curing agent is selected from the group consisting of aliphatic polyamines, aromatic polyamines and organic carboxylic anhydrides.

3. The heat-curable resinous composition set forth in claim 1, wherein the epoxy equivalent of the said polyglycidyl xylylenediamine is within the range of from 90 to 160.

4. A heat-curable resinous composition comprising 5 to 500 parts by weight of a para- or meta- polyglycidyl xylylenediamine or mixtures thereof, said polyglycidyl xylylenediamine having an epoxy equivalent within the range of from 90 to 200, and 100 parts by weight of a glycidyl ether of a polyhydric phenol having a 1,2-epoxy equivalency greater than 1, and a curing agent.

5. The heat-curable resinous composition set forth in claim 4, wherein the polyglycidyl xylylenediamine is present in the composition in an amount of 10 to 100 parts by weight per 100 parts by weight of the glycidyl ether.

6. The heat-curable resinous composition set forth in claim 4, wherein the curing agent is selected from the group consisting of aliphatic polyamines, aromatic polyamines and organic carboxylic anhydrides.

7. The heat-curable resinous composition set forth in claim 4, wherein the epoxy equivalent of the said polyglycidyl xylylenediamine is within a range of from 90 to 160.

8. A process for the preparation of a para- or meta- polyglycidyl xylylenediamine or mixtures thereof, said polyglycidyl xylylenediamine having an epoxy equivalent of 90 to 200, which comprises reacting para- or meta- xylylenediamine or mixtures thereof with 3 – 8 moles, per mole of xylylenediamine, of epichlorohydrin at a temperature of 0° to 100° C to form a xylene chlorohydrin diamine intermediate, said reaction being conducted in the presence of an aromatic hydrocarbon solvent and water, whereby the water is used in an amount of about 10 to 30 milliliters per mole of xylylenediamine, and dehydrochlorinating said intermediate by reacting it with an alkali.

9. The process set forth in claim 8, wherein epichlorohydrin is used in an amount of 3 – 6 moles per mole of the xylylenediamine.

10. The process set forth in claim 8, wherein the dehydrochlorination reaction is conducted under reduced pressure while removing water from the reaction system.

11. The process set forth in claim 8, wherein the reaction of the xylylenediamine with epichlorohydrin is conducted at 30°–60° C.

12. The process set forth in claim 8, wherein the resulting polyglycidyl xylylenediamine has an epoxy equivalent of 90 to 160.

13. The process set forth in claim 8, wherein the dehydrochlorination reaction is conducted while adding the alkali little by little in the form of an aqueous solution.

* * * * *